United States Patent
He et al.

(10) Patent No.: US 10,754,642 B2
(45) Date of Patent: Aug. 25, 2020

(54) SEARCH WITH CONTEXT IN A SOFTWARE DEVELOPMENT ENVIRONMENT

(71) Applicant: INTERNATIONAL BUSINESS MACHINES CORPORATION, Armonk, NY (US)

(72) Inventors: Jenny J. He, Chandler's Ford (GB); Adrian Kyte, Broadstone (GB); Joe Winchester, Hursley (GB); Cheng Fang Wang, Beijing (CN); Ping Xiao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/178,666

(22) Filed: Nov. 2, 2018

(65) Prior Publication Data

US 2020/0142688 A1    May 7, 2020

(51) Int. Cl.
*G06F 8/70* (2018.01)
*G06F 3/0482* (2013.01)
*G06F 16/248* (2019.01)
*G06F 16/9535* (2019.01)

(52) U.S. Cl.
CPC .............. *G06F 8/70* (2013.01); *G06F 3/0482* (2013.01); *G06F 16/248* (2019.01); *G06F 16/9535* (2019.01)

(58) Field of Classification Search
CPC ........ G06F 3/0482; G06F 8/70; G06F 16/248; G06F 16/9535
USPC ............................ 717/120–123; 707/706–712
See application file for complete search history.

(56) References Cited

U.S. PATENT DOCUMENTS

| | | | |
|---|---|---|---|
| 7,788,251 B2 | 8/2010 | Carlson et al. | |
| 7,809,703 B2 | 10/2010 | Balabhadrapatruni et al. | |
| 8,484,378 B2 | 7/2013 | Kelly et al. | |
| 8,756,223 B2 | 6/2014 | Ekstrand et al. | |
| 2008/0154855 A1* | 6/2008 | Balabhadrapatruni | G06F 16/907 |
| 2008/0228851 A1* | 9/2008 | Angelov | G06F 16/972 709/201 |
| 2009/0222423 A1* | 9/2009 | Haruta | G06F 3/0485 |
| 2009/0282022 A1* | 11/2009 | Bennett | G06F 3/0482 |
| 2011/0191756 A1* | 8/2011 | Shinjo | G06F 16/185 717/141 |
| 2012/0239643 A1* | 9/2012 | Ekstrand | G06F 16/3338 707/723 |

(Continued)

OTHER PUBLICATIONS

Kraft et al., "Searching with Context," 2006, ACM, p. 477-486. (Year: 2006).*

(Continued)

*Primary Examiner* — Qing Chen
(74) *Attorney, Agent, or Firm* — L. Jeffrey Kelly (57) ABSTRACT

A graphical user interface to a software development environment is provided. A user input is received defining an element to be searched with context and information is extracted from the software development environment relating to the software development environment and/or relating to the element. A search string is created comprising the element and the extracted information and the created search string is supplied to a search interface. A search result is received for the created search string, and the search result is outputted for the created search string.

15 Claims, 9 Drawing Sheets

(56) References Cited

U.S. PATENT DOCUMENTS

2012/0284279 A1* 11/2012 Shinjo ................. G06F 16/2228
          707/741
2013/0218867 A1*  8/2013 DeLuca ................. G06Q 50/01
          707/722
2019/0080113 A1*  3/2019 Kim .................... G06F 21/6245

OTHER PUBLICATIONS

Lu et al., "Contextual Image Search," 2011, ACM, p. 513-522. (Year: 2011).*

Anonymous, "Applying Sentence Analysis to Improve Search Results", An IP.com Prior Art Database Technical Disclosure, IP.com No. IPCOM000246827D, IP.com Electronic Publication Date: Jul. 5, 2016, https://priorart.ip.com/IPCOM/000246827, 3 pages.

Mell et al., "The NIST Definition of Cloud Computing," National Institute of Standards and Technology, Sep. 2011, p. 1-3, Special Publication 800-145.

* cited by examiner

SEARCH WITH CONTEXT IN A SOFTWARE DEVELOPMENT ENVIRONMENT

BACKGROUND

The present invention relates to a computer implemented method, data processing system and computer program product for performing a search with context.

Internet search engines are commonly used to gather information. The search engines provide search results according to relevance, for example, the most viewed search result may be listed first. The search results may require filtering of the relevant information as it is presented to search for the information related to the particular environment that a user is searching from.

SUMMARY

According to a first aspect of the present invention, there is provided a computer implemented method including maintaining a graphical user interface to a software development environment, receiving a user input defining an element to be searched with context, extracting information from the software development environment relating to the software development environment and/or relating to the element, creating a search string including the element and the extracted information, supplying the created search string to a search interface, receiving a search result for the created search string, and outputting the search result for the created search string.

According to a second aspect of the present invention, there is provided a data processing system including a processor arranged to maintain a graphical user interface to a software development environment, receive a user input defining an element to be searched with context, extract information from the software development environment relating to the software development environment and/or relating to the element, create a search string including the element and the extracted information, supply the created search string to a search interface, receive a search result for the created search string, and output the search result for the created search string.

According to a third aspect of the present invention, there is provided a computer program product for controlling a data processing system including a processor, the computer program product including a computer readable storage medium having program instructions embodied therewith, the program instructions executable by the processor to cause the processor to maintain a graphical user interface to a software development environment, receive a user input defining an element to be searched with context, extract information from the software development environment relating to the software development environment and/or relating to the element, create a search string including the element and the extracted information, supply the created search string to a search interface, receive a search result for the created search string, and output the search result for the created search string.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to performing a search with context. The following described exemplary embodiments provide a system, method, and program product to, among other things, provide an option to a user to perform a search related to a displayed element on a screen, such that the search is defined by the displayed element, information related to the element related to the location of the element within the content of the current display, and information related to the software development environment of the element. Therefore, the present embodiment has the capacity to improve the technical field of searching by narrowing search results to more pertinent information.

According to one embodiment, a method may provide relevant content of the software product when searching for information related to the software product. The search may be originated from a software program being used and can use an existing search engine on the internet. The search string may contain the software context, such as the name of the software being used, the version of the software, the language it is started on, the user interface being used, and other information, in addition to what a user is searching for. For example, the search string may contain a class name provided by the software, a message on the user interface, or a free form input, etc. This method may provide a more relevant search result than using current search engines.

The following described exemplary embodiments provide a system, method, and program product to provide an internet search result depend on a search term and a context of where the search term is being used or displayed.

Figure 1:
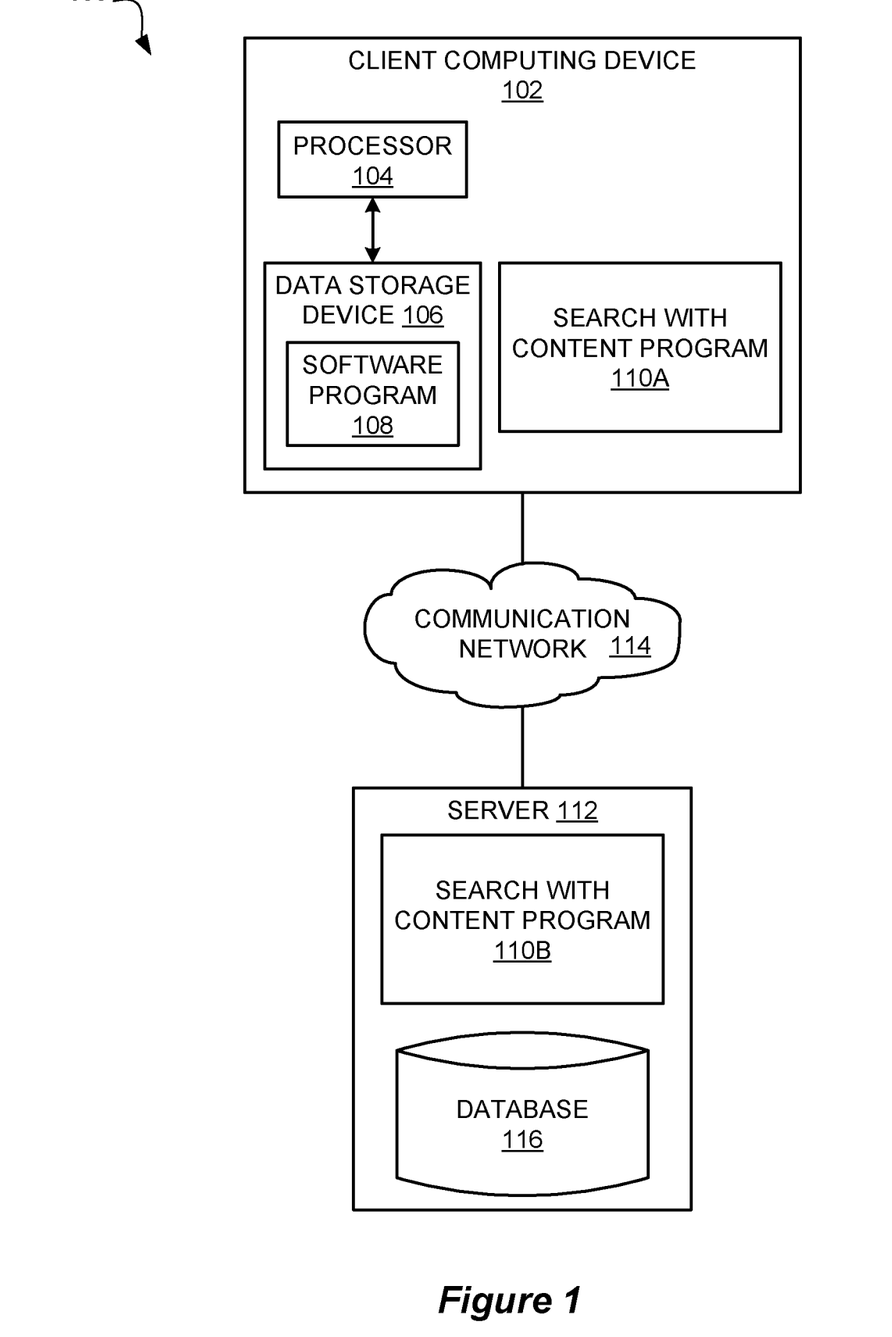
FIG. 1 depicts an exemplary networked computer environment, according to an embodiment of the present invention.

Referring to FIG. 1, an exemplary networked computer environment 100 is depicted, according to an embodiment. The networked computer environment 100 may include client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and a search with content program 110A and communicate with the server 112 via the communication network 114, in accordance with an embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to the following figures, the client computing device 102 may include internal components and external components, respectively.

The server 112 may be a laptop computer, netbook computer, personal computer (PC), a desktop computer, or any programmable electronic device or any network of programmable electronic devices capable of hosting and running a search with content program 110B and a database 116 and communicating with the client computing device 102 via the communication network 114, in accordance with embodiments of the invention. As will be discussed with reference to FIG. 7, the server computer 112 may include internal components and external components, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, search with content program 110A, 110B may be a program capable of improving search results. The improved search with content method is explained in further detail below with respect to FIGS. 2-6.

Figure 2:
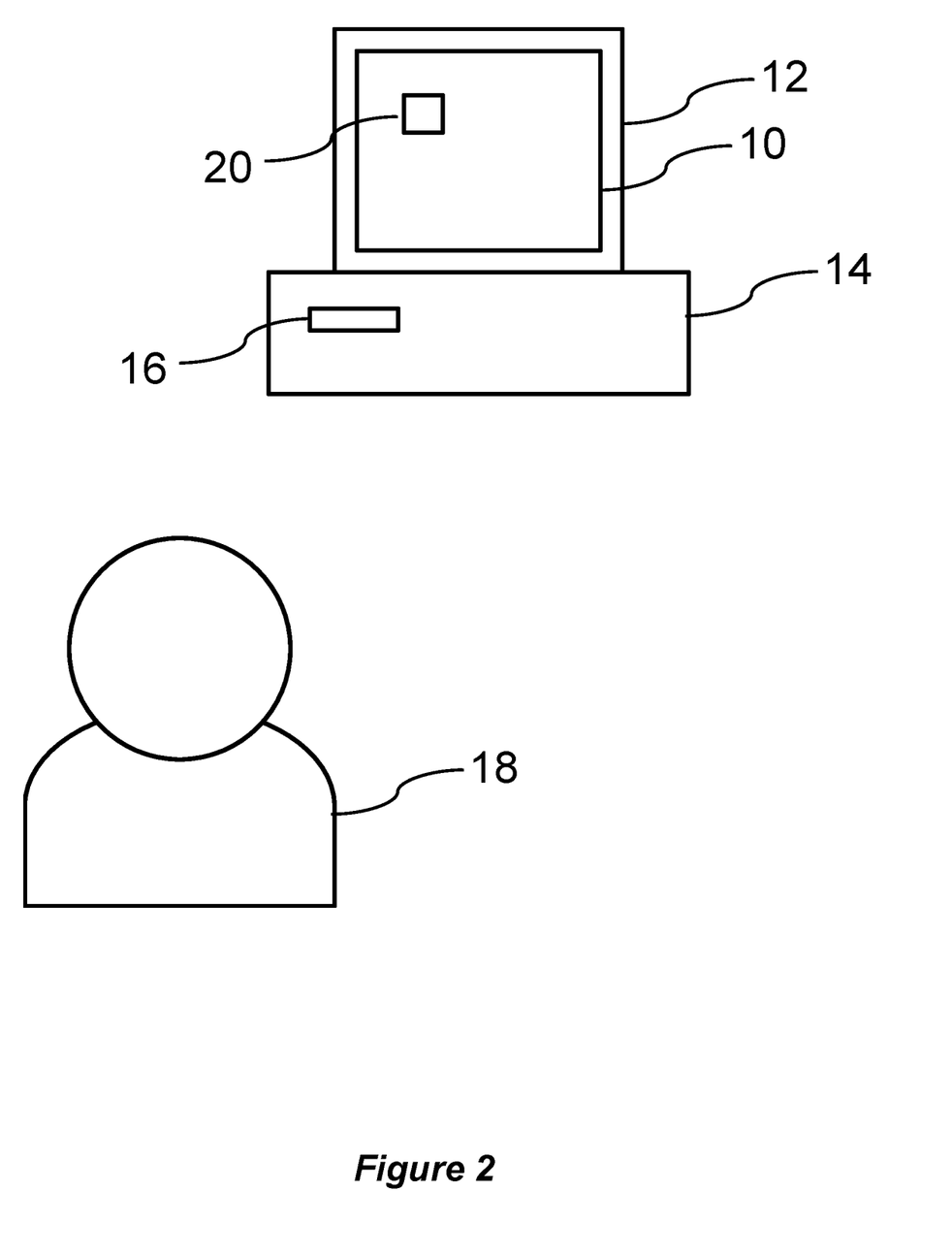
FIG. 2 depicts a schematic diagram of a graphical user interface of a software development environment, according to an embodiment of the present invention.

Referring to FIG. 2, a schematic diagram of a graphical interface of a software development environment is shown, according to an embodiment. A graphical user interface 10 is being shown on a display device 12. The display device 12 is connected to a processor 14, which is operating a software development environment (hereinafter "SDE") 16. The processor 14 may be as described above in relation to the client computing device 102 or the server 112. A user 18 is using the SDE 16 to create or amend at least part of a software product. If the user 18 wishes to find out further information in relation to a specific displayed element 20, the user can make a selection relating to the displayed element 20 within the graphical user interface 10, which will provide the user with further options, such as by showing a drop-down menu within the graphical user interface 10.

Included within the additional options provided to the user in response to their selection of the displayed element 20 is a "search with context" option. This option allows the user 18 to perform a search in respect of the displayed element 20, but with the search more narrowly focussed than just a search strictly based on the element 20 in question. For example, the user 18 may see a method with the name "printStackTrace" in a Java® (Java is a registered trademark of Oracle Corporation) program, and the user may be unfamiliar with this method. The user's access to the search with context option will allow the use to perform a search on this method, but with additional information included within a search string.

The processor 14 that is operating the software development environment 16 is configured to create a search string that not only includes the element 20 that is of interest to the user 18 (printStackTrace) but also includes additional content which will ensure that the results of any search that is performed on the search string will be of greater relevance to the user 18 in relation to the current work that they are performing. An external search service, such as Google®, (Google is a registered trademark of Google, LLC) is provided with the created search string in order to provide a set of results which are then fed back to the user 18, as the result of the user 18 selecting the search with context option.

Figure 3:
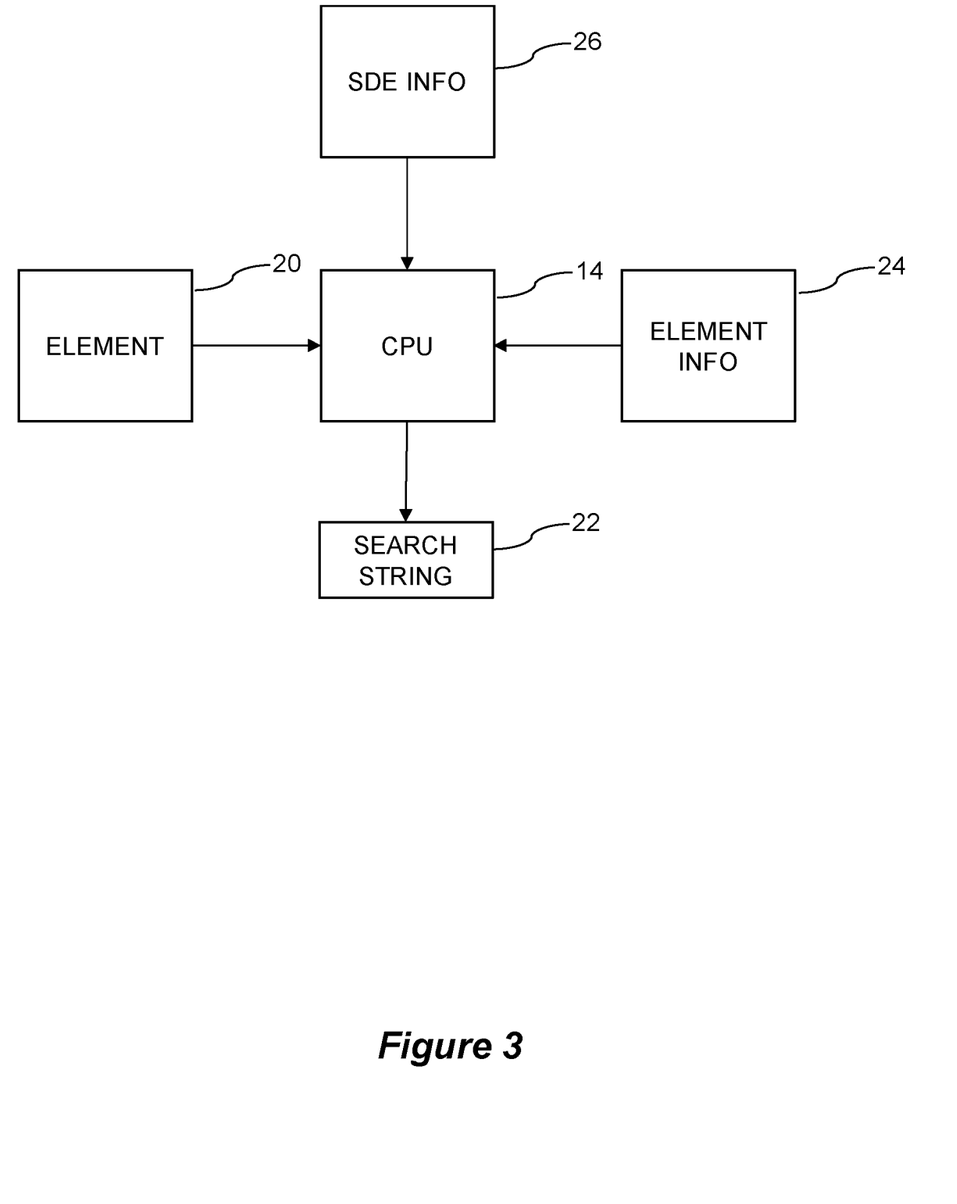
FIG. 3 depicts a schematic diagram of a process for creating a search string, according to an embodiment of the present invention.

Referring to FIG. 3, a schematic diagram of a process for creating a search string is shown, according to an embodiment. The creation of a search string 22 by the processor or central processing unit (hereinafter "CPU") 14 is illustrated. The processor 14 has three inputs, which are the displayed element 20 itself, information (shown as Element Info) 24 relating to the element 20 and information (shown as SDE Info) 26 relating to the software development environment (hereinafter "SDE") 16. The search string 22 is preferably created from all three sources or could be created from just two of the sources, with either the information 24 relating to the element 20 being used or the information 26 relating to the software development environment 16 being used. The processor 14 defaults to using all three inputs to create the search string 22, but this can be changed by the user 18.

When a user 18 selects the context with search option for a displayed element 20, the search string 22 is created dynamically in the background by the processor 14, without the user 18 having to make any further input into the search string 22. When the search with context is selected by the user 18, the processor 14 creates a search string 22 that contains the element 20 and also contains additional information (24 and/or 26) that will mean that any search made on the search string 22 will be more relevant to the user 18. The inclusion of the additional information narrows the search, since fewer things will match the longer search string 22 when compared to a search string that contains the displayed element 20 only.

The dynamic creation of the search string 22 means that particularly the information 24 that relates to the displayed element 20 will depend very specifically on the location of the element 20 within the context of the user's current work. This information 24 that relates to the displayed element 20 might be a class that implements the displayed element 20 selected by the user 28. For example, if the selected element 20 is a method within a Java® program, then the additional information may be the class that implements the specific method that has been selected by the user 18. In other programming languages other components within the program hierarchy may be included as part of the search string 22.

Figure 4:
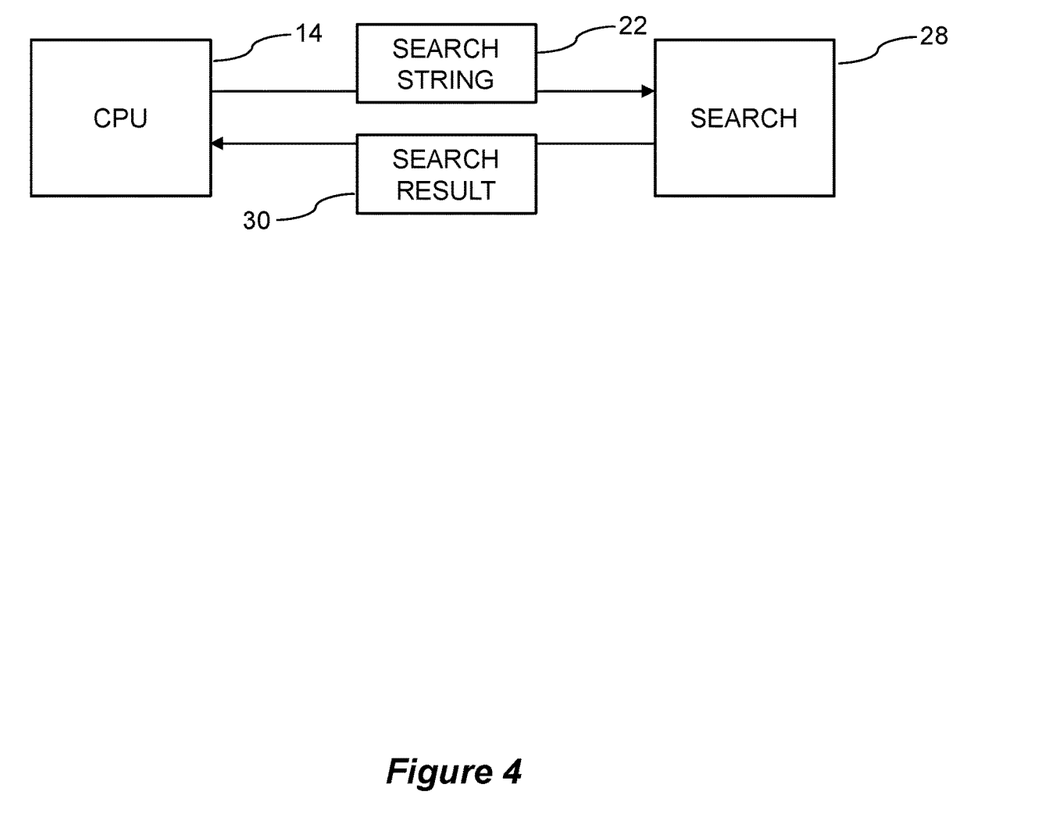
FIG. 4 depicts a schematic diagram of a process of supplying a search string to a search interface, according to an embodiment of the present invention.

Referring to FIG. 4, a schematic diagram of a process of supplying a search string to a search interface is shown, according to an embodiment. As illustrated, the process of transmitting the search string 22 to an external search interface (shown as Search) 28 is shown. A search result 30 is received for the created search string 22 back from the search interface 28. This process can be as simple as the processor 14 accessing a web browser and connected to an external search service such as Google® and supplying the search string 22 to the Google® home page. The result 30 of the search with context is then outputted by the processor 14 to the user 18, either directly through the graphical user interface 10 or via a new window popping up or even by the user 18 simply being presented with the search result 30 in a browser.

Preferably, when the user 18 is shown the search result 30 for the search string 22 they are also shown the actual search string 22 that has been provided to the search interface 28 by the processor 14. This helps the user 18 to understand the additional information that has been provided to the search interface 28 in addition to the displayed element 20. The user 18, by selecting the search with context option for the displayed element 20, wishes to receive a search result 30 that is more focused to their current work, but also can be helped by knowing exactly what context has been added to the search string 22 operated on by the search interface 28.

Figure 5:
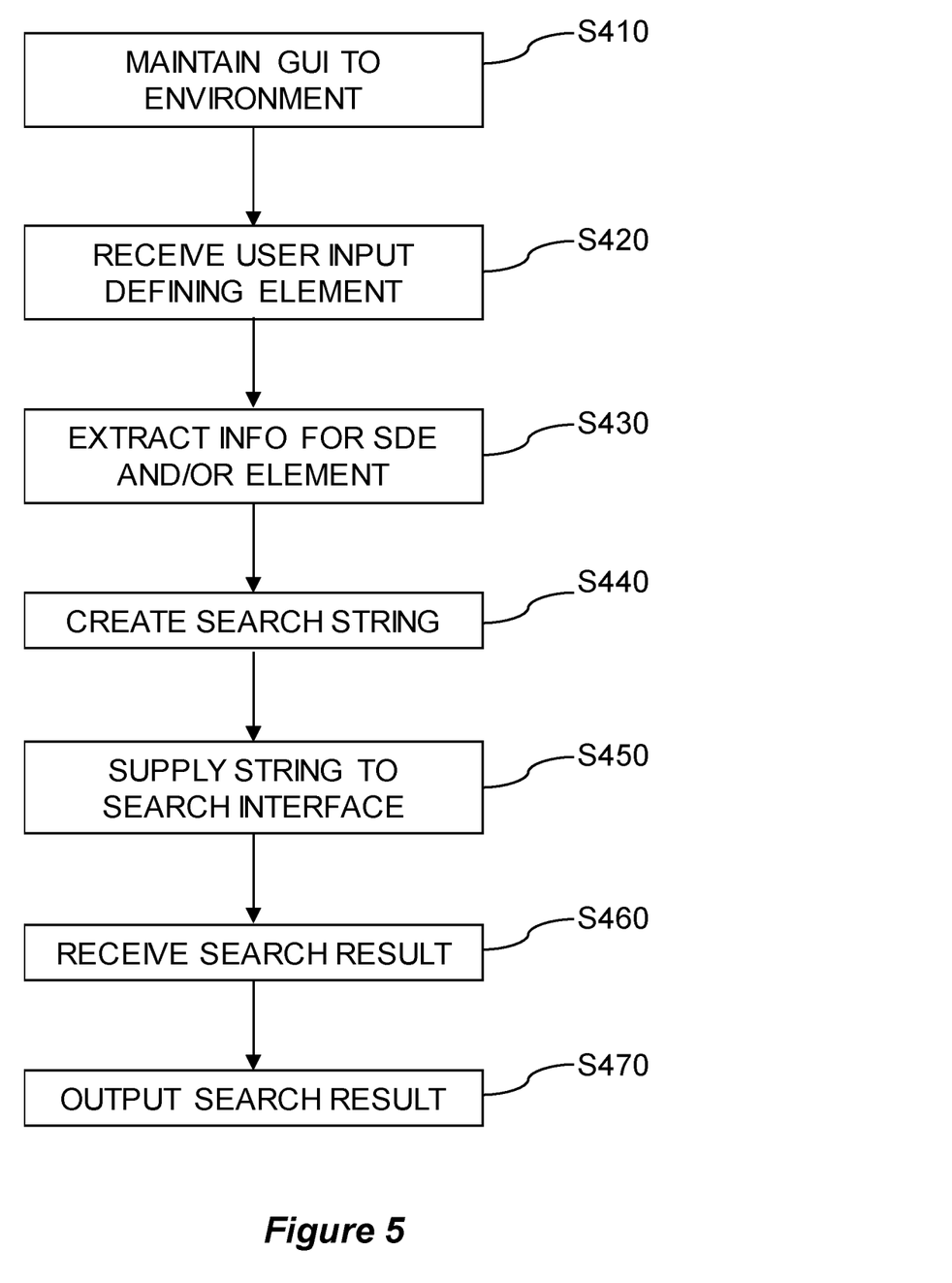
FIG. 5 depicts a flowchart of a method of performing a search with context, according to an embodiment of the present invention.

Referring to FIG. 5, a flowchart of a method of performing the search with context is shown, according to an embodiment. The first step of the method is step S410, which includes maintaining a graphical user interface (shown "GUI") 10 to a software development environment 16. The next stage of the method is step S420, which includes receiving a user input defining an element 20 to be searched with context. The element 20 can be a displayed element 20 that the user 18 has selected through the graphical user interface 10, for example by right-clicking on a displayed element 20 or can be a free form text entry that the user 18 has typed into a suitable "search with context" box in the graphical user interface. In this latter case, the graphical user interface 10 generates a user input text field, receives a user input in the text field and generates the element 20 from the user's input in the text field.

This is followed by step S430, which includes extracting information from the software development environment (shown "SDE") 16 relating to the software development environment 16 and/or relating to the element 20. The next step is S440, which includes creating a search string 20 including the element 20 and the extracted information 24 and/or 26. In this way, the processor 14 creates an expanded search string 22 in response to the user's selection of the search with context option for the element 20.

The next step of the method is step S450, which includes supplying the created search string 22 to a search interface 28. This is followed by the next step S460, which includes receiving a search result 30 for the created search string 22, and the method completes with the final step S470, which includes outputting the search result 30 for the created search string 22. In this way, the created search string 22 is passed to an external search interface 28 which will perform a search on the supplied search string 22. A search result 30 is generated by the search interface 28 and this is passed back to the processor 14 for outputting to the user 18. The user 18 receives a search with context result 30 for the displayed element 20 that they originally selected.

The extracted information 24 and/or 26 from the software development environment 16 relating to the software development environment 16 and/or relating to the element 20 preferably includes one or more of: the name of the software development environment 16, the version of the software development environment 16, the language on which the software development environment 16 is started, and the graphical user interface 10 being used in the software development environment 16. Information about the environment 16 is added to the element 20 in the creation of the search string 22. Information relating to the environment 16 is useful to narrow the search to provide more relevant information to the user 18.

For example, the name and version of the environment 16 and the name of the software language currently being worked on by the user 18 can all be added to the element 20 in the creation of the search string 22. This is all done automatically and dynamically once the user 18 has made the selection that they wish to perform the search with context in relation to the displayed element 20. The returned search result 30 is then more narrowly focussed into the user's working area and will more likely to be directly relevant to the user's current work. The content of the search result 30 is improved by the more detailed search string 22.

Additionally, the extracted information 24 and/or 26 from the software development environment 16 relating to the software development environment 16 and/or relating to the element 20 includes a class that implements the element 20 within the graphical user interface 10 selected by the user 18. The processor 14, in creating the search string 22 can add specific hierarchical information about the displayed element 20 to the search string 22. For example, if the displayed element 20, which the user wishes to better understand, is a method within a class, then the class name can be added to the search string 22. Depending upon the nature of the language being used by the user 18, further higher hierarchical components can be added to the search string 22.

The processor 14 can also be configured to generate a series of options defining different levels of detail in respect of the information 24 and/or 26 to be extracted from the software development environment 16, and then receive a user input selecting one of the series of options and extract information 24 and/or 26 from the software development environment 16 relating to the software development environment 16 and/or relating to the element 20 according to the selected option. This allows the user 18 to fine tune the nature of the information that is being added by the processor 14 to the search string 22. Selections can be made by the user in respect of both the level of detail in relation to the environment 16 and in respect of the displayed element 20 itself.

Preferably, the processor 14 is configured to output the search result 30 for the created search string 22 with the created search string 22. The user 18 is then able to see the full search string 22 along with the actual search result 30. This has two advantages for the user 18, first, they can see what information has been added to the displayed element 20 to create the augmented search string 22 and second, the user 18 can therefore change the search string 22 by adding further terms to the search string 22 or deleting part(s) of the search string 22. This latter advantage allows the user to easily adapt the search string 22 and obtain a more relevant search result 30.

The process shown in FIG. 5 is preferably carried out by a data processing system.

Figure 6:
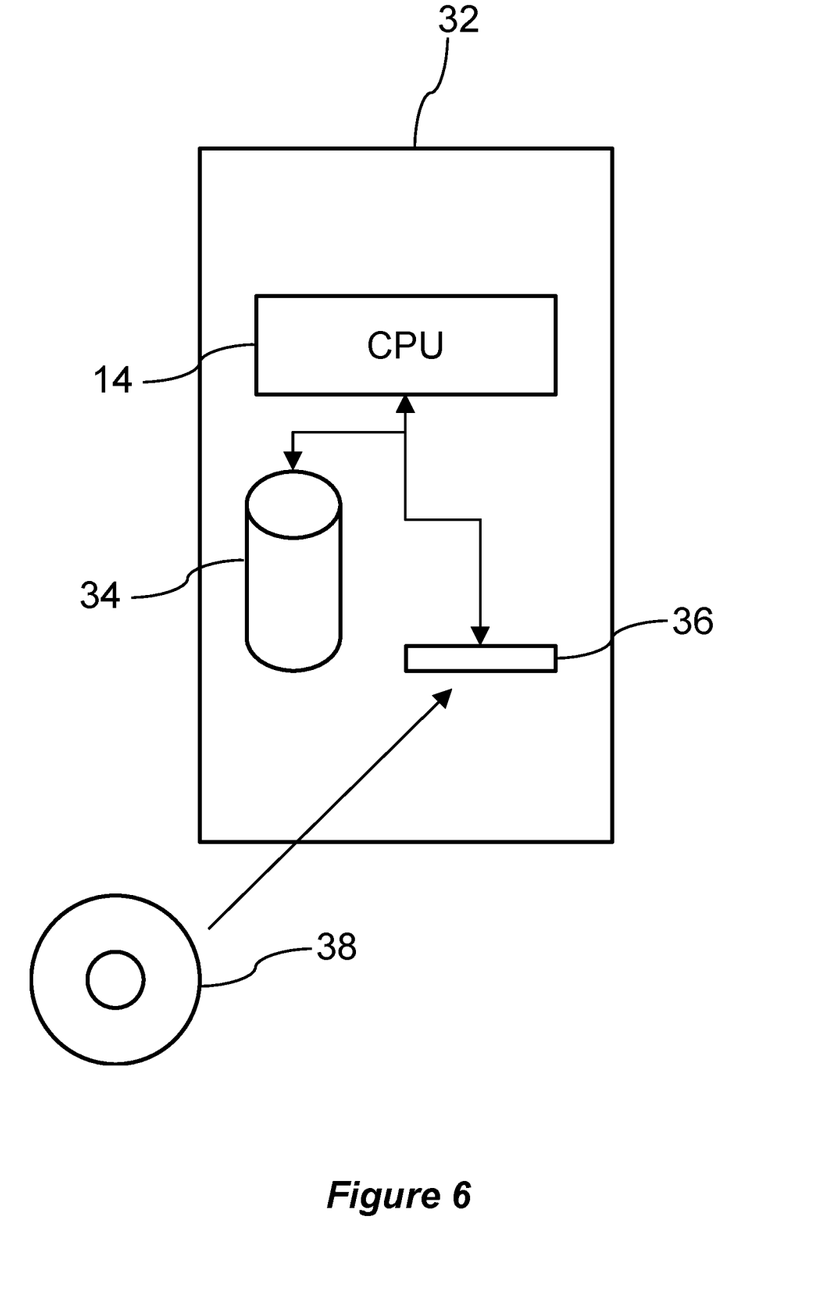
FIG. 6 depicts a schematic diagram of data processing system, according to an embodiment of the present invention.
Figure 7:
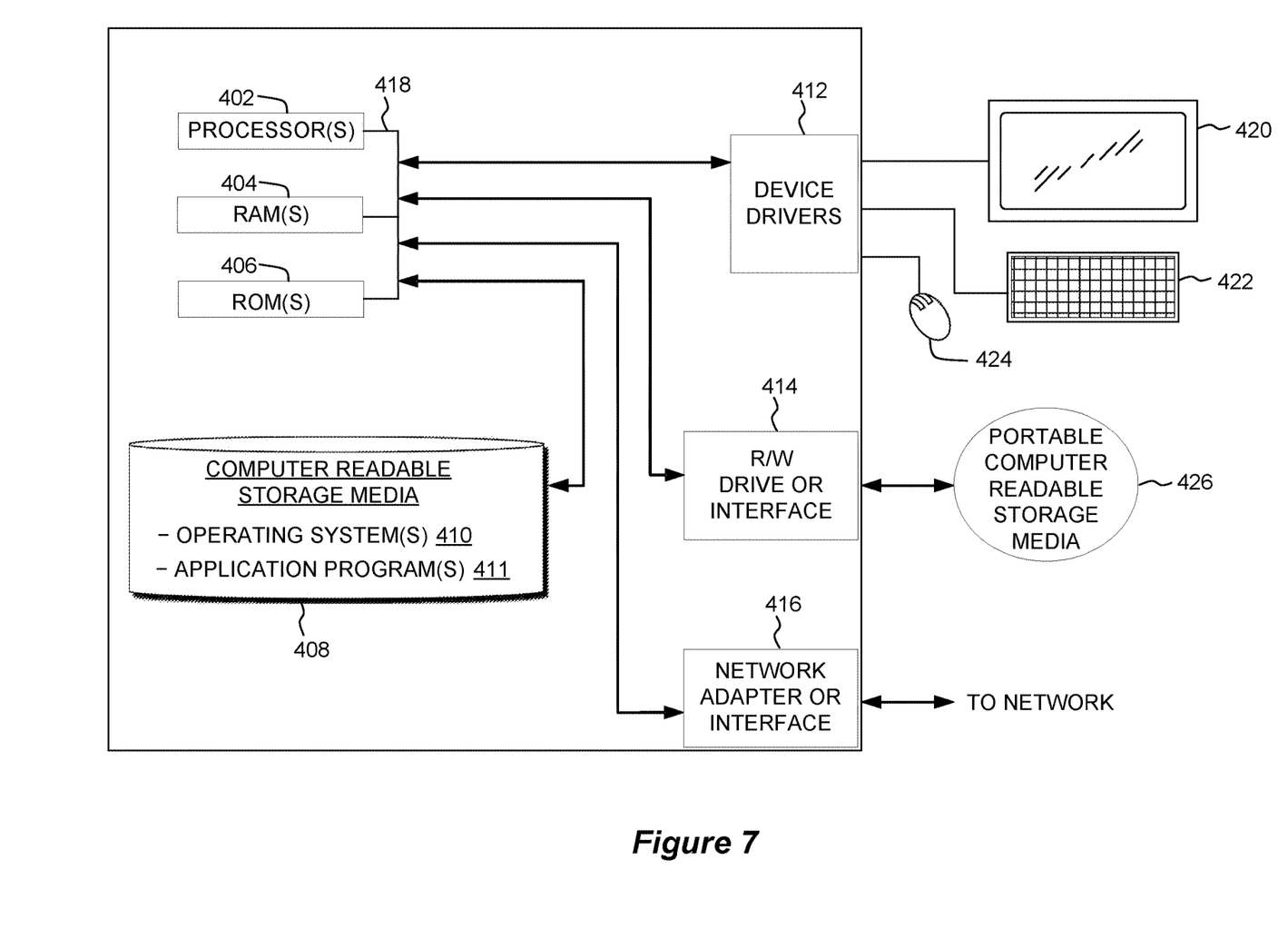
FIG. 7 depicts a block diagram of internal and external components of computers and servers depicted in FIG. 1, according to an embodiment of the present invention.

Referring to FIG. 6, an embodiment of a data processing system 32 is shown, according to an embodiment. An additional example of the data processing system 32 is shown in FIG. 7. The system 32 includes the processor (shown "CPU") 14, which controls the operation of the data processing system 32. The processor 14 of the data processing system 32 is connected to a local storage device 34 and to a local interface 36. A computer readable storage medium 38 is provided, which is a CD-ROM 38 storing a computer program product that can be used to control the processor 14 to operate the data processing system 32. The processor 14 executes instructions from the computer program product to operate the data processing system 32.

The system 32 provides a method which provides the relevant context of a software product 16 when the user 18 searches for information related to the software product 16. The search will be originated from the software product 16 using an existing search engine on the Internet, such as Google®. The search string 22 will preferably contain the software context, such as the name of the software, the version of the software, the language it is started on, the GUI it is showing etc., in addition to whatever the user would like to search for, which can be, for example a class name provided by the software, message on a GUI, a free form input etc. With this method the final search result 30 is much more relevant to what the user 18 currently is working on.

The system 32 enables the user 18 to originate the search by, for example, use case one: right clicking on a class name/method in code or using a short-cut key when highlighting a class name in a software; use case two: on a software UI right-click on a text, message or a field; and use case three: a free form input that resides in the software UI and has a field for the user 18 to type in a search term. The system will enable user to originate the search by, for example, use case 1) right click on a class name/method in code or using a short-cut key when highlight a class name in a software; use case 2) on a software UI right-click on a text, message or a field; use case 3) a free form input that resides in the software UI and has a field for user to type in a search term.

As detailed above, the user 18 originates a search from a software product 16. When the search is actioned, the system 32 extracts the context of the software 16, such as the name of the software, the version of the software, the language it is started on, the GUI it is showing, the class (for example Java® class) that implements a selected method, etc. The system 32 can decide or be customized for the level of details to extract from the software product 16. The system 32 combines the extracted software context with the code, the message, or the search term as the search string 22. The system 32 invokes an external search engine 28 either in the form of API service provided or through a web browser and sends the combined search string 22 to be searched. The system 32 displays the search result in the software product 16 which is integrated with the user interface 10 or the search result 30 is shown in a web browser.

When the search finishes, the result 30 will be much more relevant to the software that the user 18 is working on.

To illustrate use case one, a user 18 has selected print-StackTrace method in a Java® program. A pop up menu "Search with context" appears for the user 18 to select. When the search is performed, the system 32 will get the exact Java® class that implements this method (for example, java.Lang.Throwable), the version of the Java® that contains the class (for example version 8) from the environment 16 that the user 18 is working on, and form the search string 22, here "throwable printstacktrace java 8" and perform the search via an internet search engine 28, either through an API these search engine provide or by launching the search on a web browser. The search result 30 is shown to the user 18 which is integrated into the graphical user interface 10, or via a web browser. The search result 30 is much more relevant to the version and the class that the user 18 is working on.

In use case two of a context-relevant search on a text string in a software product is a user 18 selects some text in the graphical user interface 10, for example "Create a CICS® bundle", and picks the "search with context" option to search, which in turn gets the context of for example "IBM® CICS Explorer® 5.4 create CICS® bundle". IBM, CICS, and CICS Explorer are each a registered trademark of International Business Machines, Corporation. This search string 22 is then passed to an external search interface 28 and the search result 30 is passed back to the user 18. In use case three with a free form input, the user 18 launches the search from a software product menu. This drives the search through the search interface 28 with the input string and the context information such as product name and version which make up the search string 22. This search string 22 is then passed to an external search interface 28 and the search result 30 is passed back to the user 18.

It may be appreciated that FIGS. 1-6 provides only an illustration of an implementation and does not imply any limitations with regard to how different embodiments may be implemented. Many modifications to the depicted environments may be made based on design and implementation requirements.

Referring now to FIG. 7, a block diagram of components of a computing device, such as the server 112 of FIG. 1, in accordance with an embodiment of the present invention is shown. It should be appreciated that FIG. 7 provides only an illustration of an implementation and does not imply any limitations with regard to the environments in which different embodiments may be implemented. Many modifications to the depicted environment may be made.

The computing device may include one or more processors 402, one or more computer-readable RAMs 404, one or more computer-readable ROMs 406, one or more computer readable storage media 408, device drivers 412, read/write drive or interface 414, network adapter or interface 416, all interconnected over a communications fabric 418. Communications fabric 418 may be implemented with any architecture designed for passing data and/or control information between processors (such as microprocessors, communications and network processors, etc.), system memory, peripheral devices, and any other hardware components within a system.

One or more operating systems 410, and one or more application programs 411 are stored on one or more of the computer readable storage media 408 for execution by one or more of the processors 402 via one or more of the respective RAMs 404 (which typically include cache memory). For example, the search with content program 110A, 110B may be stored on the one or more of the computer readable storage media 408. In the illustrated embodiment, each of the computer readable storage media 408 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The computing device may also include the R/W drive or interface 414 to read from and write to one or more portable computer readable storage media 426. Application programs 411 on the computing device may be stored on one or more of the portable computer readable storage media 426, read via the respective R/W drive or interface 414 and loaded into the respective computer readable storage media 408.

The computing device may also include the network adapter or interface 416, such as a TCP/IP adapter card or wireless communication adapter (such as a 4G wireless communication adapter using OFDMA technology). Application programs 411 may be downloaded to the computing device from an external computer or external storage device via a network (for example, the Internet, a local area network or other wide area network or wireless network) and network adapter or interface 416. From the network adapter or interface 416, the programs may be loaded onto computer readable storage media 408. The network may comprise copper wires, optical fibers, wireless transmission, routers, firewalls, switches, gateway computers and/or edge servers.

The computing device may also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414 and network adapter or interface 416 may comprise hardware and software (stored on computer readable storage media 408 and/or ROM 406).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access a normalized search engine or related data available in the cloud. For example, the normalized search engine could execute on a computing system in the cloud and execute normalized searches. In such a case, the normalized search engine could normalize a corpus of information and store an index of the normalizations at a storage location in the cloud. Doing so allows a user to access this information from any computing system attached to a network connected to the cloud (e.g., the Internet).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
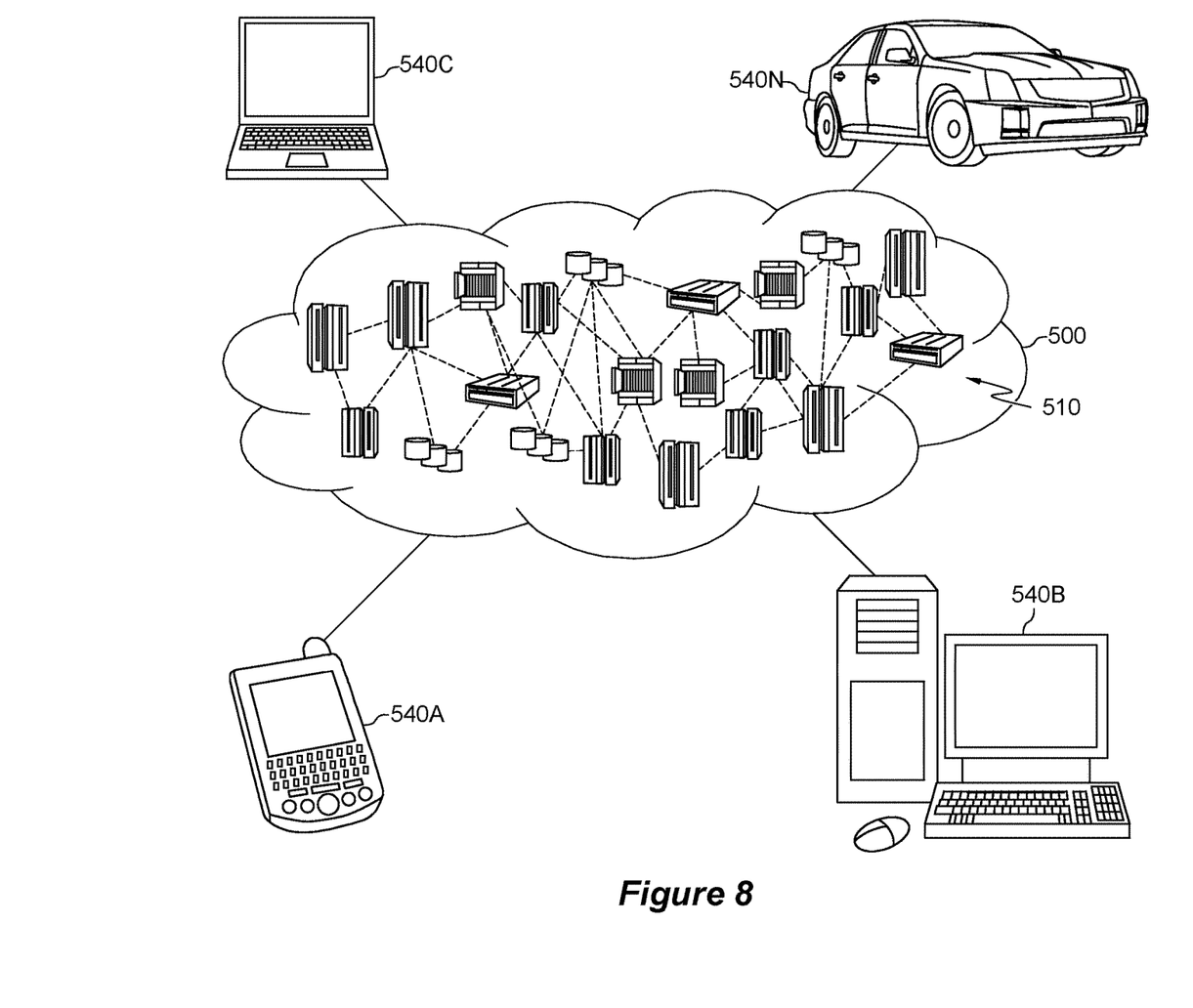
FIG. 8 depicts a cloud computing environment, according to an embodiment of the present invention.

Referring now to FIG. 8, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 540A, desktop computer 540B, laptop computer 540C, and/or automobile computer system 540N may communicate. Cloud computing nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 540A-N shown in FIG. 8 are intended to be illustrative only and that cloud computing nodes 510 and cloud computing environment 500 can communicate with any type of computerized device over any type of network and/or network addressable connection (e.g., using a web browser).

Figure 9:
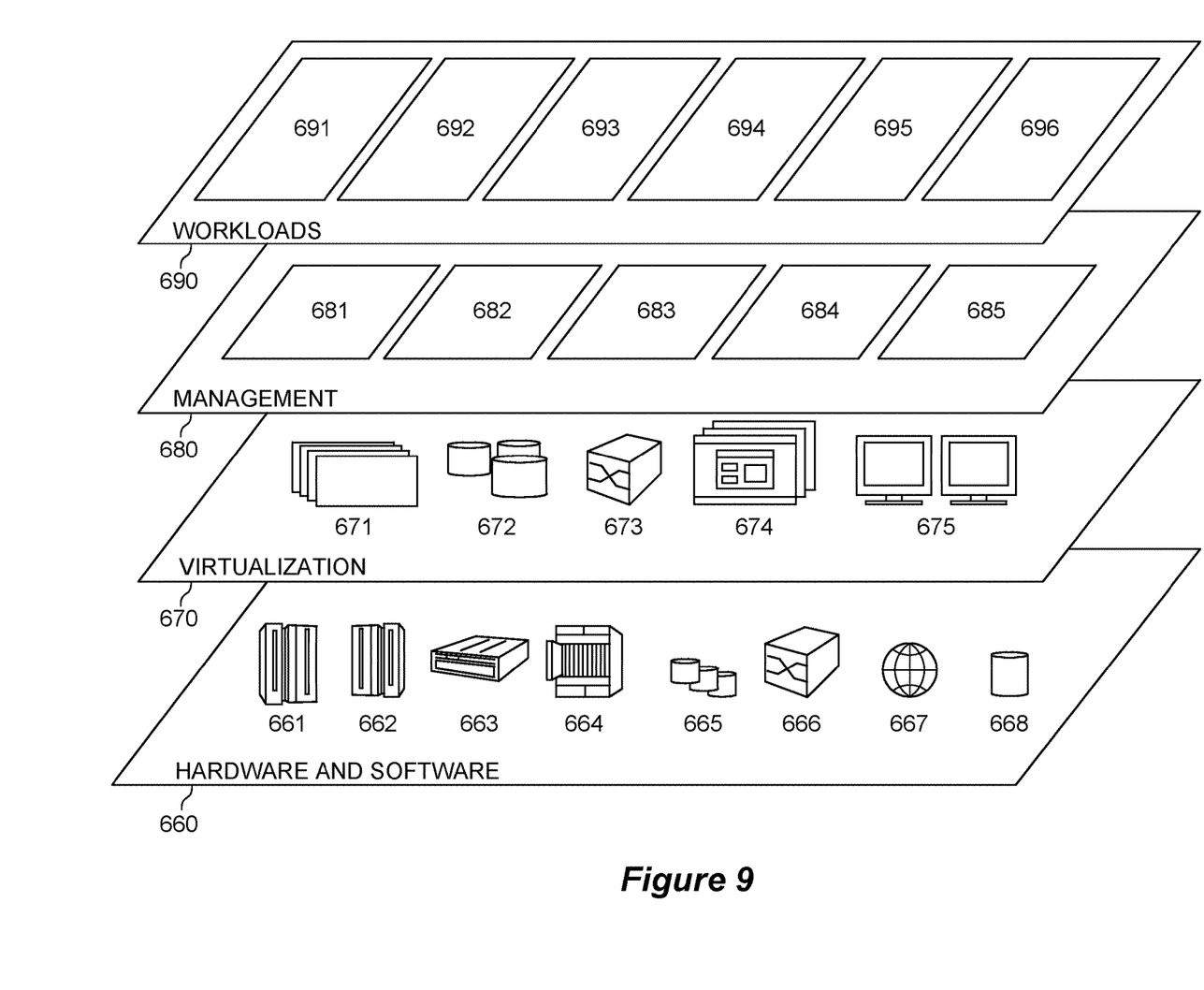
FIG. 9 depicts abstraction model layers, according to an embodiment of the present invention.

Referring now to FIG. 9, a set of functional abstraction layers provided by cloud computing environment 500 (as shown in FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672, for example the data storage device 106 as shown in FIG. 1; virtual networks 673, including virtual private networks; virtual applications and operating systems 674; and virtual clients 675.

In an example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and improved context search 696. The improved context search 696 may relate to a search related to a displayed element on a screen.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method, the processor-implemented method comprising:
   maintaining a graphical user interface to a software development environment;
   receiving a user input defining a displayed element on a display screen of a user to be searched with context;
   generating a series of options defining different levels of detail of information to be extracted from the software development environment;
   receiving a user input selecting an option of the series of options;
   extracting information from the software development environment according to the user selected option relating to the software development environment, wherein the extracted information from the software development environment according to the user selected option relating to the software development environment comprises a name of the software development environment, a version of the software development environment, a language on which the software development environment is started, and a graphical user interface being used in the software development environment;

extracting information from the software development environment according to the user selected option relating to the displayed element on the display screen of the user, wherein the extracted information from the software development environment according to the user selected option relating to the displayed element on the display screen of the user comprises a name of the software development environment, a version of the software development environment, a language on which the software development environment is started, and a graphical user interface being used in the software development environment;

creating a search string comprising the extracted information from the software development environment according to the user selected option relating to the software development environment and the extracted information from the software development environment according to the user selected option relating to the displayed element on the display screen of the user;

supplying the created search string to a search interface;

receiving a search result for the created search string; and outputting the search result for the created search string on the display screen of the user.

2. The processor-implemented method according to claim 1, wherein the extracted information from the software development environment according to the user selected option relating to the software development environment further comprises a class that implements the displayed element on the display screen of the user defined by the user.

3. The processor-implemented method according to claim 1, wherein the extracted information from the software development environment according to the user selected option relating to the displayed element on the display screen of the user further comprises a class that implements the displayed element on the display screen of the user defined by the user.

4. The processor-implemented method according to claim 1, wherein outputting the search result for the created search string on the display screen of the user comprises outputting the search result for the created search string with the created search string on the display screen of the user.

5. The processor-implemented method according to claim 1, further comprising:

outputting the created search string on the display screen of the user;

receiving a user input edited search sting;

supplying the user edited search string to the search interface;

receiving a search result for the user edited search string; and outputting the search result for the user edited search string on the display screen of the user.

6. A computer system, the computer system comprising:

one or more processors, one or more memories, one or more computer readable storage media, and program instructions stored on at least one computer readable storage medium of the one or more computer readable storage media for execution by at least one processor of the one or more processors via at least one memory of the one or more memories, wherein the computer system is capable of performing a method comprising:

maintaining a graphical user interface to a software development environment;

receiving a user input defining a displayed element on a display screen of a user to be searched with context;

generating a series of options defining different levels of detail of information to be extracted from the software development environment;

receiving a user input selecting an option of the series of options;

extracting information from the software development environment according to the user selected option relating to the software development environment, wherein the extracted information from the software development environment according to the user selected option relating to the software development environment comprises a name of the software development environment, a version of the software development environment, a language on which the software development environment is started, and a graphical user interface being used in the software development environment;

extracting information from the software development environment according to the user selected option relating to the displayed element on the display screen of the user, wherein the extracted information from the software development environment according to the user selected option relating to the displayed element on the display screen of the user comprises a name of the software development environment, a version of the software development environment, a language on which the software development environment is started, and a graphical user interface being used in the software development environment;

creating a search string comprising the extracted information from the software development environment according to the user selected option relating to the software development environment and the extracted information from the software development environment according to the user selected option relating to the displayed element on the display screen of the user;

supplying the created search string to a search interface;

receiving a search result for the created search string; and outputting the search result for the created search string on the display screen of the user.

7. The computer system according to claim 6, wherein the extracted information from the software development environment according to the user selected option relating to the displayed element on the display screen of the user further comprises a class that implements the displayed element on the display screen of the user defined by the user.

8. The computer system according to claim 6, wherein the extracted information from the software development environment according to the user selected option relating to the software development environment further comprises a class that implements the displayed element on the display screen of the user defined by the user.

9. The computer system according to claim 6, wherein outputting the search result for the created search string on the display screen of the user comprises outputting the search result for the created search string with the created search string on the display screen of the user.

10. The computer system according to claim 6, further comprising:

outputting the created search string on the display screen of the user;

receiving a user input edited search sting;

supplying the user edited search string to the search interface;

receiving a search result for the user edited search string; and outputting the search result for the user edited search string on the display screen of the user.

11. A computer program product, the computer program product comprising:
one or more computer readable storage media and program instructions stored on at least one computer readable storage medium of the one or more computer readable storage media, the program instructions executable by a processor, the program instructions comprising:
program instructions to maintain a graphical user interface to a software development environment;
program instructions to receive a user input defining a displayed element on a display screen of a user to be searched with context;
program instructions to generate a series of options defining different levels of detail of information to be extracted from the software development environment;
program instructions to receive a user input selecting an option of the series of options;
program instructions to extract information from the software development environment according to the user selected option relating to the software development environment, wherein the extracted information from the software development environment according to the user selected option relating to the software development environment comprises a name of the software development environment, a version of the software development environment, a language on which the software development environment is started, and a graphical user interface being used in the software development environment;
program instructions to extract information from the software development environment according to the user selected option relating to the displayed element on the display screen of the user, wherein the extracted information from the software development environment according to the user selected option relating to the displayed element on the display screen of the user comprises a name of the software development environment, a version of the software development environment, a language on which the software development environment is started, and a graphical user interface being used in the software development environment;
program instructions to create a search string comprising the extracted information from the software development environment according to the user selected option relating to the software development environment and the extracted information from the software development environment according to the user selected option relating to the displayed element on the display screen of the user;
program instructions to supply the created search string to a search interface;
program instructions to receive a search result for the created search string; and
program instructions to output the search result for the created search string on the display screen of the user.

12. The computer program product according to claim 11, wherein the extracted information from the software development environment according to the user selected option relating to the displayed element on the display screen of the user further comprises a class that implements the displayed element on the display screen of the user defined by the user.

13. The computer program product according to claim 11, wherein the extracted information from the software development environment according to the user selected option relating to the software development environment further comprises a class that implements the displayed element on the display screen of the user defined by the user.

14. The computer program product according to claim 11, wherein outputting the search result for the created search string on the display screen of the user comprises outputting the search result for the created search string with the created search string on the display screen of the user.

15. The computer program product according to claim 11, further comprising:
program instructions to output the created search string on the display screen of the user;
program instructions to receive a user input edited search sting;
program instructions to supply the user edited search string to the search interface;
program instructions to receive a search result for the user edited search string; and
program instructions to output the search result for the user edited search string on the display screen of the user.

* * * * *